(12) United States Patent
Wastell

(10) Patent No.: US 11,140,907 B2
(45) Date of Patent: Oct. 12, 2021

(54) FISH FILLETING MACHINE

(71) Applicant: Pisces Fish Machinery, Inc., Wells, MI (US)

(72) Inventor: Trevor T. Wastell, Gladstone, MI (US)

( * ) Notice: Subject to any disclaimer, the term of this patent is extended or adjusted under 35 U.S.C. 154(b) by 0 days.

(21) Appl. No.: 16/868,434

(22) Filed: May 6, 2020

(65) Prior Publication Data

US 2020/0352181 A1 Nov. 12, 2020

Related U.S. Application Data

(60) Provisional application No. 62/844,640, filed on May 7, 2019.

(51) Int. Cl.
| | |
|---|---|
| *A22C 25/00* | (2006.01) |
| *A22C 25/14* | (2006.01) |
| *A22C 25/18* | (2006.01) |
| *A22C 25/08* | (2006.01) |
| *A22C 25/16* | (2006.01) |

(52) U.S. Cl.
CPC ............ *A22C 25/145* (2013.01); *A22C 25/08* (2013.01); *A22C 25/16* (2013.01); *A22C 25/18* (2013.01)

(58) Field of Classification Search
CPC ..... A22C 25/00; A22C 25/145; A22C 25/147; A22C 25/16; A22C 25/18
USPC .................................. 452/106, 120, 121, 123
See application file for complete search history.

(56) References Cited

U.S. PATENT DOCUMENTS

| | | | | |
|---|---|---|---|---|
| 4,236,275 | A * | 12/1980 | Westerdahl ............ | A22C 25/16 452/135 |
| 5,098,334 | A * | 3/1992 | Molaug .................. | A22C 25/14 452/116 |
| 5,167,570 | A * | 12/1992 | Ryan ...................... | A22C 25/16 452/160 |
| 5,830,052 | A * | 11/1998 | Wadsworth .......... | A22C 25/163 452/161 |
| 6,322,437 | B1 * | 11/2001 | Grabau .................. | A22C 25/16 452/161 |
| 7,090,574 | B2 * | 8/2006 | Braeger ................. | A22C 25/16 452/162 |
| 8,272,928 | B2 * | 9/2012 | Finke ..................... | A22C 25/16 452/161 |
| 8,814,637 | B2 * | 8/2014 | Jurs ........................ | A22C 25/16 452/162 |
| 8,956,205 | B2 * | 2/2015 | Kowalski ............... | A22C 25/16 452/135 |

* cited by examiner

*Primary Examiner* — Richard T Price, Jr.
(74) *Attorney, Agent, or Firm* — Wozny IP Law; Thomas M. Wozny

(57) ABSTRACT

A method and apparatus for filleting fish to produce high yielding fillets from relatively short bodied fish in the size range of about 600 grams to about 3.5 kilograms dependent on species. The method and apparatus are designed to be capable of handling salmon, tilapia, trout, arctic char, barramundi, snappers, walleye pike, striped bass and similar species where the rib follows the contour of the belly cavity. Further, the method and apparatus incorporate belly opening and eviscerating components prior to subjecting the fish to a backbone removal system so that the fish need only be headed, but not gutted, before introduction into the machine.

13 Claims, 11 Drawing Sheets

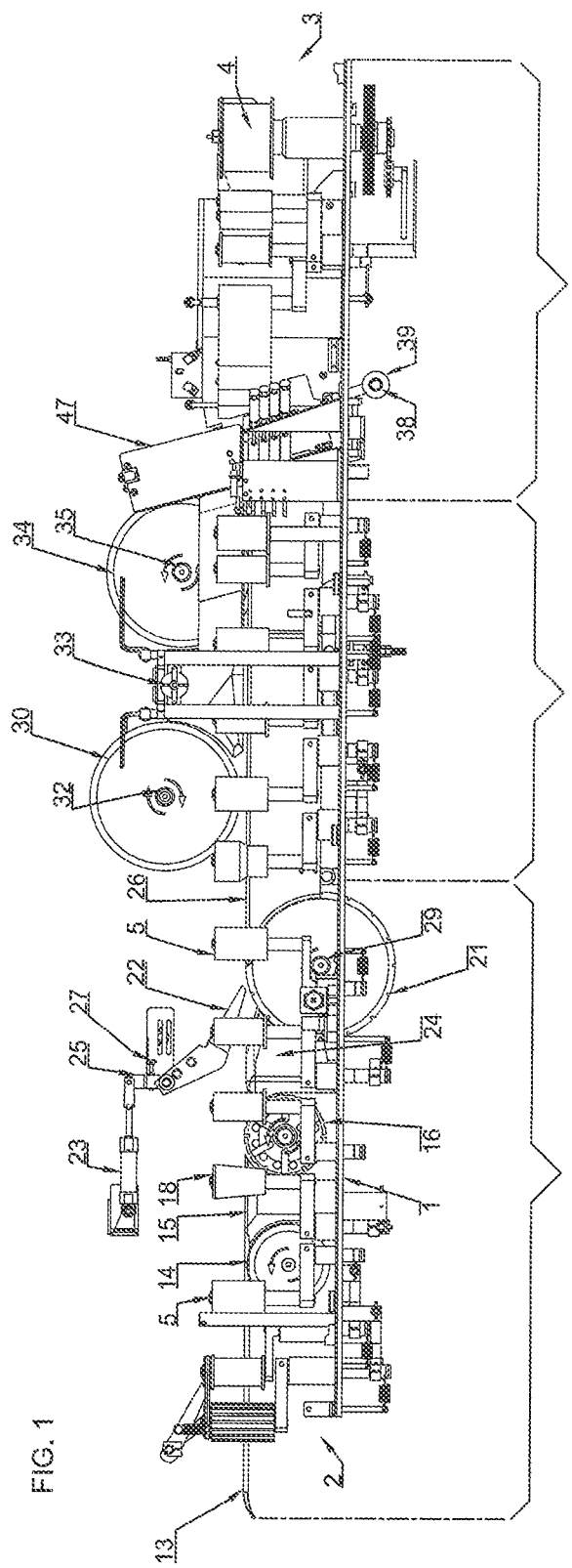

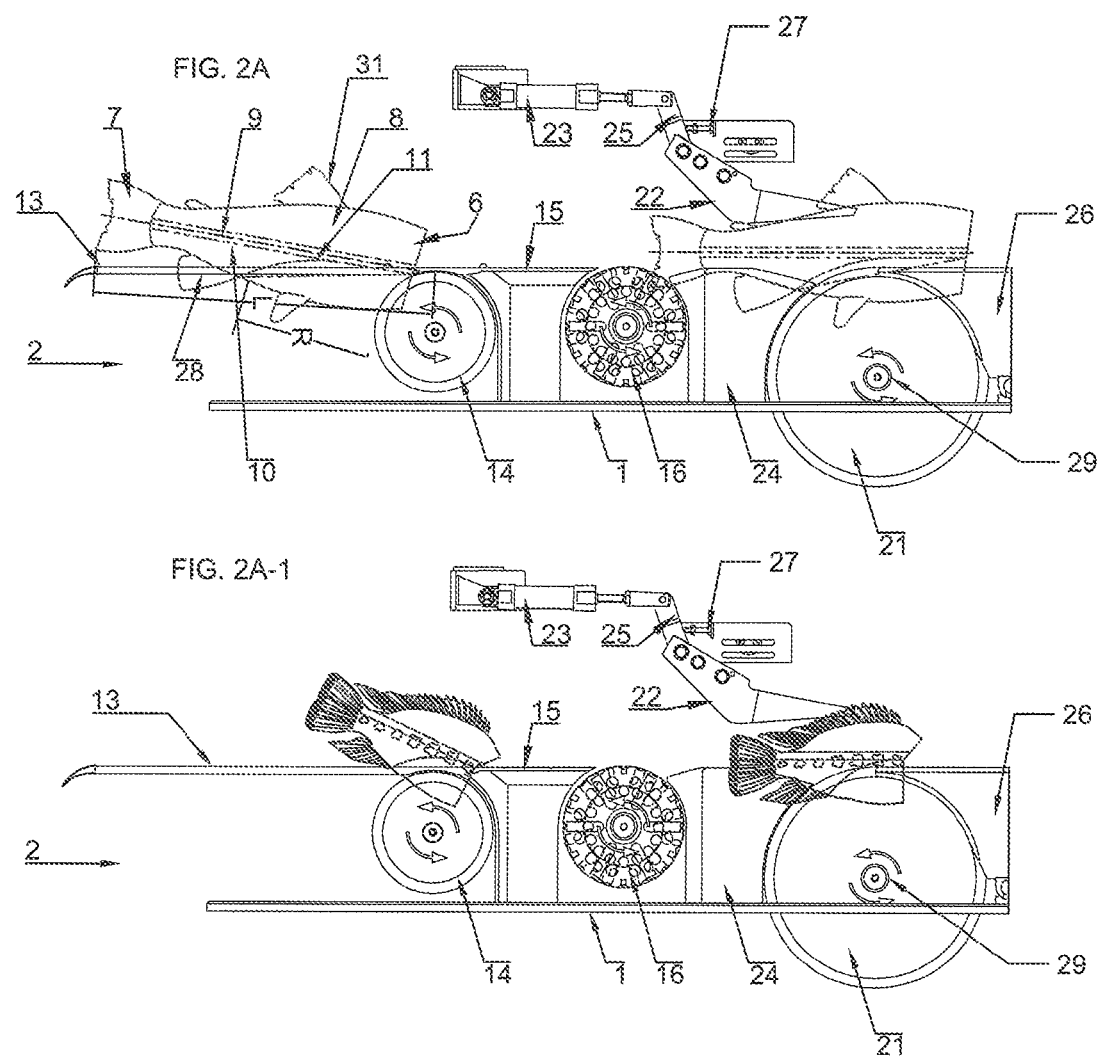

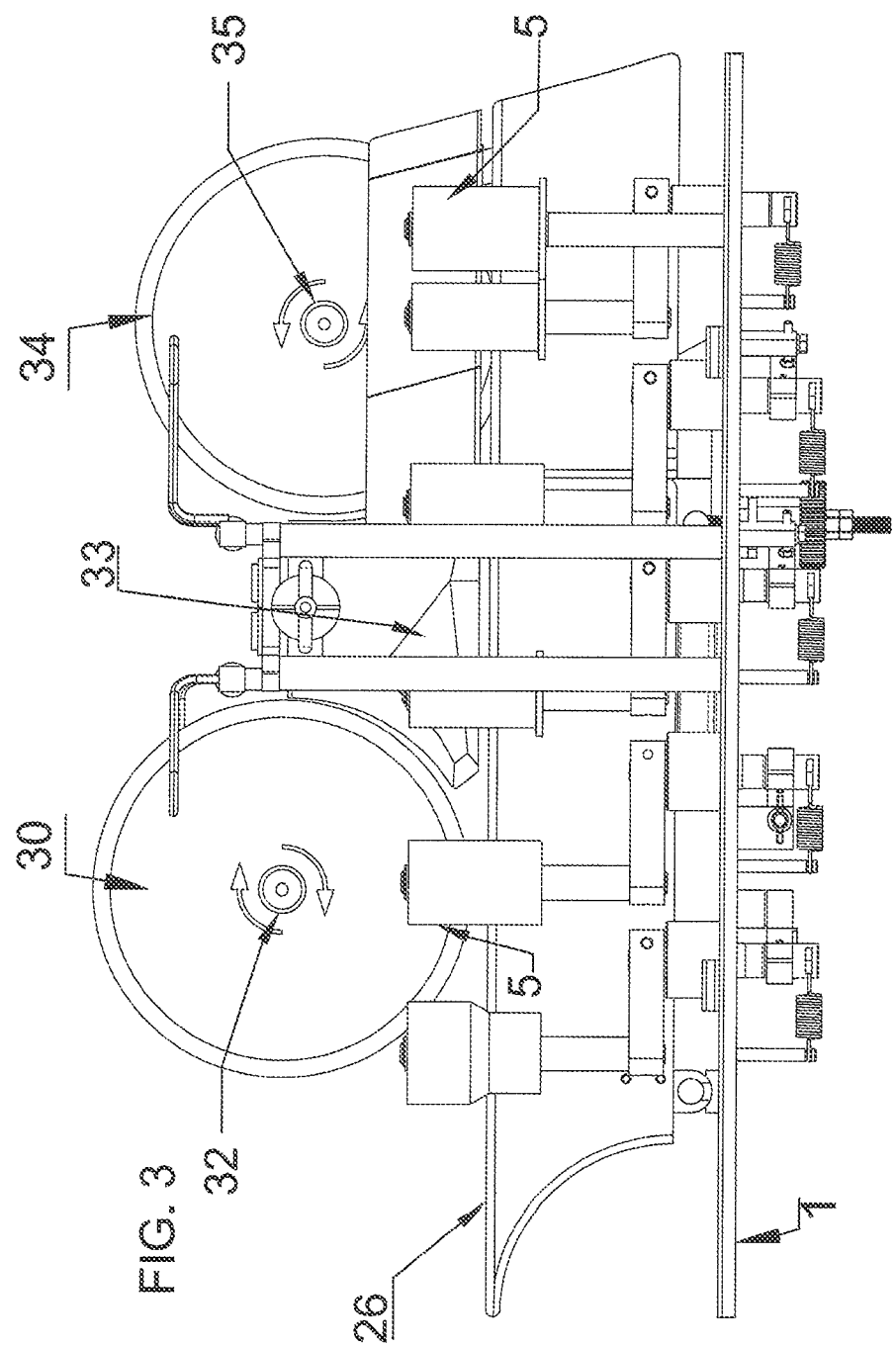

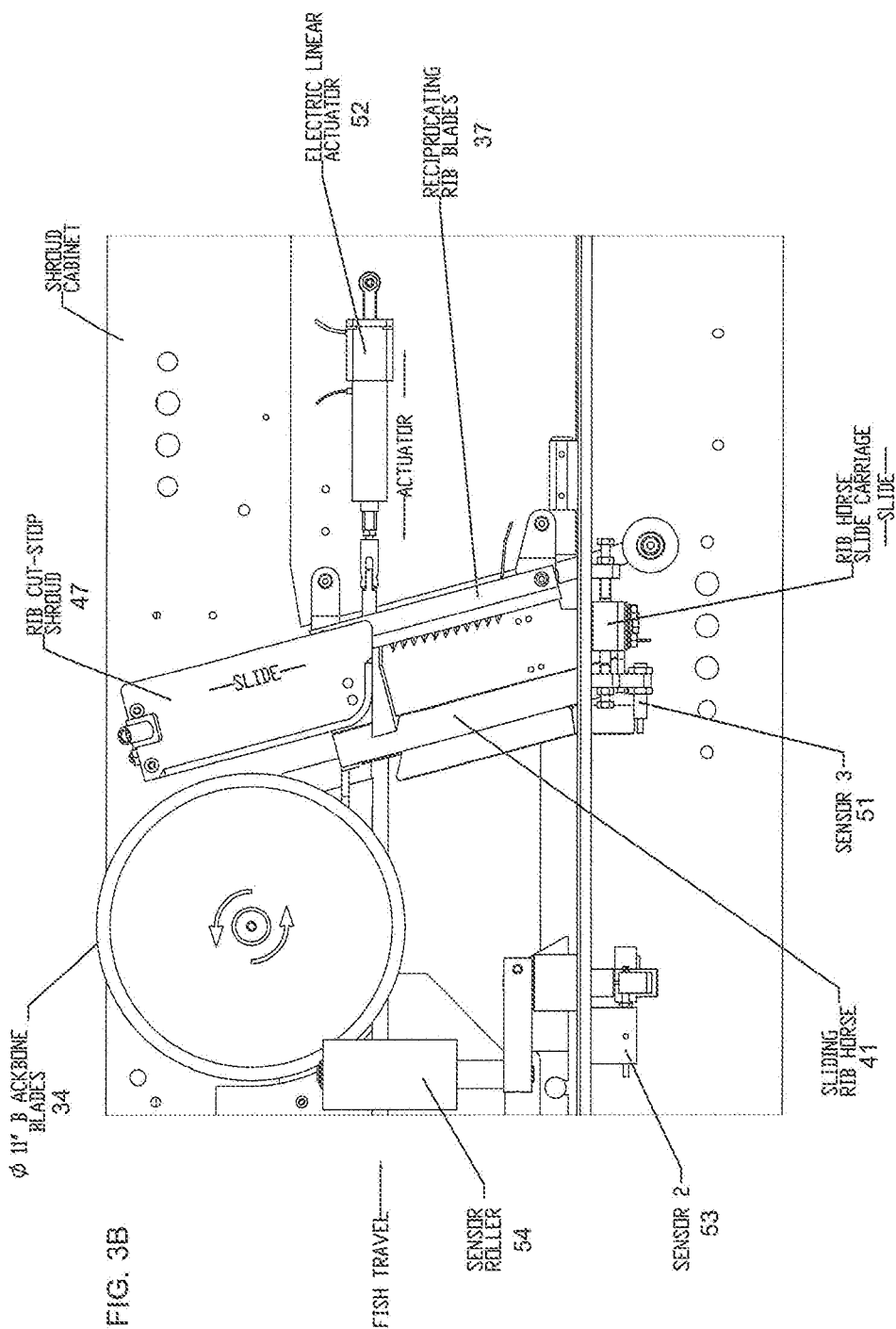

FISH FILLETING MACHINE

BACKGROUND OF THE INVENTION

The present invention relates to fish processing, and more specifically to a method and apparatus for filleting fish.

Machines for cleaning and filleting fish are well known in the art. Such machines utilize various mechanisms for removing the viscera, bones and undesirable belly meat to provide a pair of fillets free of bones. However, due to the difficulty of properly positioning different size fish and different species of fish with respect to the cleaning and cutting devices, meat loss problems are a concern. It is therefore desirable to minimize the amount of meat loss in order to maximize economic return.

In order to achieve maximum meat recovery when removing the backbone of a fish as the fish is transported downstream in a fish filleting machine via belts and rollers, it is common practice in fish filleting machines to utilize three sets of blades. These blades are sequentially configured so that a first set of blades cuts up to the backbone at the anal fin width, a second set of blades cuts above the backbone at the dorsal spine width, and a third set of blades removes the backbone without contact with the flesh above and below the backbone of the fish. Ejection of the backbone results in a pair of ribs-in fillets which are then transported to a rib removal section of the machine. See for example U.S. Pat. No. 5,520,576. For this method to be employed efficiently, the back bone of the fish is used as the locating datum so as to set the position of the backbone of the fish to be transported through these three sets of blades at the correct location and angle of orientation. Thus, the backbone should be in a plane parallel to the direction of travel, and at a height that allows the backbone to pass over the anal fin cut and under the dorsal fin cut. This method is successful on relatively long bodied fish with a belly cavity length to body length/body height ratio such that it allows the backbone to stay relatively parallel to the required plane of travel when locating on the backbone in the internal belly cavity. However, when attempting to use such a system with relatively short bodied fish, the belly cavity to body length/body height ratio is such that locating on the backbone inside the belly cavity results in the angle of the backbone to be outside the parameters necessary for transportation in the required plane for successful backbone removal.

In addition, machines such as those illustrated and described in U.S. Pat. No. 5,520,576 require the relatively long bodied fish being processed to be headed and gutted before being fed into the machine. However, it would be desirable to provide a fish filleting machine that can utilize the above-noted three blade backbone removal system to efficiently process relatively short bodied fish that are headed, but not gutted.

SUMMARY OF THE INVENTION

The present invention provides an improved method and apparatus for filleting fish to produce high yielding fillets from relatively short bodied fish in the size range of about 600 grams to about 3.5 kilograms dependent on species. The method and apparatus are designed to be capable of handling salmon, tilapia, trout, arctic char, barramundi, snappers, walleye pike, striped bass and similar species where the rib follows the contour of the belly cavity. Further, the method and apparatus incorporate belly opening and eviscerating components prior to subjecting the fish to the above-noted three blade backbone removal system so that the fish need only be headed, but not gutted, before introduction into the machine.

The fish filleting machine has a unique system for locating relatively short bodied fish so that the belly opening and eviscerating components may be used to initially open the belly and eviscerate the fish without damaging meat. This is accomplished by locating the fish on a guide probe that enters the belly of the fish just below its backbone and exits the belly at the anus of the fish.

Locating relatively short bodied fish on the backbone inside the belly cavity, however, causes the backbone of the fish to be at an angle to the plane of travel instead of being parallel to the plane of travel. As a result, the angle of orientation of the backbone is unsuitable and outside the desired plane of travel required for efficient transportation through the three blade backbone removal system. Thus, the present method and fish filleting machine provides for repositioning the backbone of the fish at the correct location and at the correct angle parallel to the plane of travel to enable the efficient removal of the backbone using the three blade backbone removal system for high meat yield. This is accomplished by pushing down the back of the fish after it passes over the eviscerating cleaning wheel and just past top dead center of the anal cut blades until the backbone of the fish is substantially parallel to the desired direction of travel. In a preferred embodiment, the back of the fish is pushed down into the correct orientation by a control arm actuated by an air cylinder. The timing of control arm actuation is determined by a programmable logic controller, or PLC, and is based on the number of encoder pulses representing the distance the fish has traveled in the machine.

Subsequent to the three blade backbone removal system, the present method and apparatus provides for precise control of rib removal from the ribs-in fillets. Rib removal from a rib-in fillet is accomplished by utilizing four rib-engaging fingers that are individually controlled to exert pressure on the outside of the fillet in order to push the ribs of the fillet under reciprocating rib removal blade. The pressure on each finger is individually controlled by the PLC so that both the amount of pressure and the duration of the application of pressure can be varied depending on the fish species being processed and the thickness of the ribs to be removed. Pressure may then be gradually reduced as the fillet passes the rib removal blade in accordance with the reduction in the thickness of the ribs which typically get thinner towards the end of the rib cage. The ability to vary the pressure on the rib-in fillet relative to the reciprocating rib removal blades permits a reduction in the amount of meat lost when the ribs are removed.

BRIEF DESCRIPTION OF THE DRAWINGS

FIG. 2A is a side view in elevation of the inlet section of the fish filleting machine illustrating a first species of fish in its initial position angled with respect to the plane of travel to enable evisceration by the belly opening blade and cleaning wheel, and its reposition parallel to the plane of travel to enable downstream removal of the backbone;

FIG. 2A-1 is a side view in elevation of the inlet section of the fish filleting machine illustrating a second species of fish in its initial position angled with respect to the plane of travel to enable evisceration by the belly opening blade and cleaning wheel, and its reposition parallel to the plane of travel to enable downstream removal of the backbone;

FIG. 2B-1 is a top view similar to FIG. 2B except illustrating the pair of idler rollers on opposite sides of the guide horse in their actuated positions;

FIG. 2C-1 is an end view illustrating a fish passing over the cleaning wheel to thereby remove the viscera without damage to the belly cavity of the fish;

FIG. 3 is a side view in elevation of the offal section of the fish filleting machine illustrating the back or dorsal cutting blades and the backbone removal blades;

FIG. 3A-1 is a side view of the offal section shown in FIG. 3A;

FIG. 3B is a side view in elevation of the backbone removal station and the rib removal station;

FIG. 4A-1 is an end view of the rib removal station illustrating a pair of rib-in fillets entering the station;

FIG. 4B-1 is a side view in elevation of the outfeed section shown in FIG. 4B with the rib shroud raised to permit rib cutting by the rib removal blades; and FIG. 4B-2 is a side view in elevation similar to FIG. 4B-1 except illustrating the rib shroud lowered to prevent further rib cutting by the rib removal blades.

DETAILED DESCRIPTION OF THE INVENTION

Figure 2:
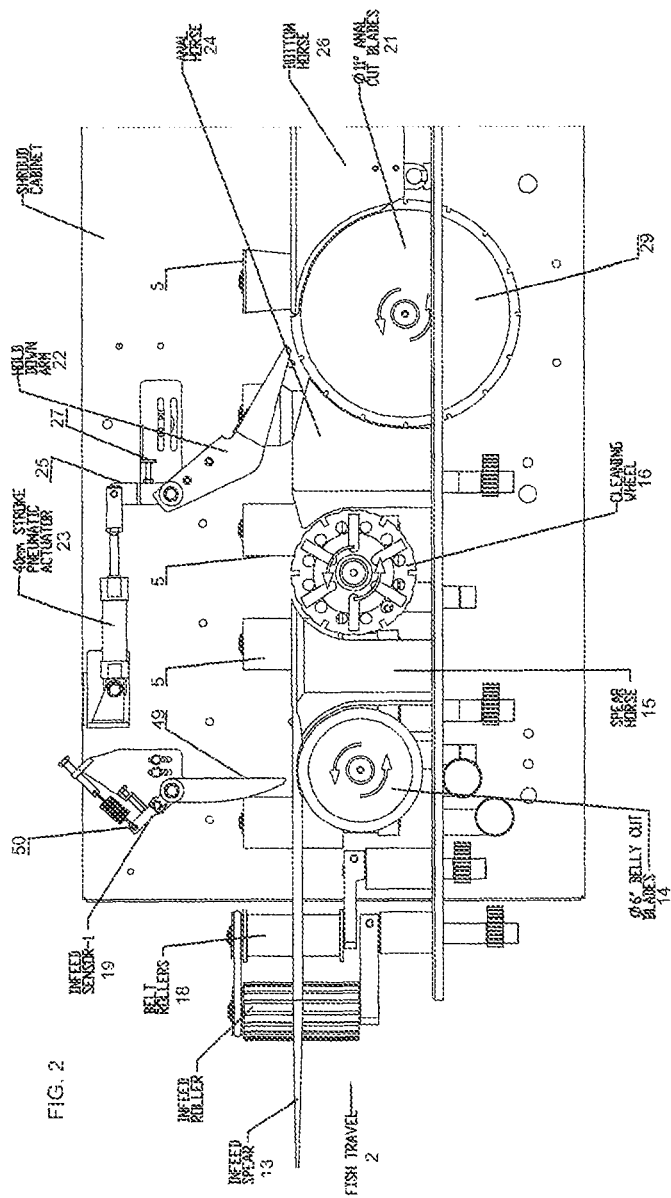
FIG. 2 is a side view in elevation of the inlet section of the fish filleting machine of FIG. 1 illustrating the guide probe, belly opening blade, cleaning wheel, anal fin cut blades, and push down control arm for the machine.
Figure 2B:
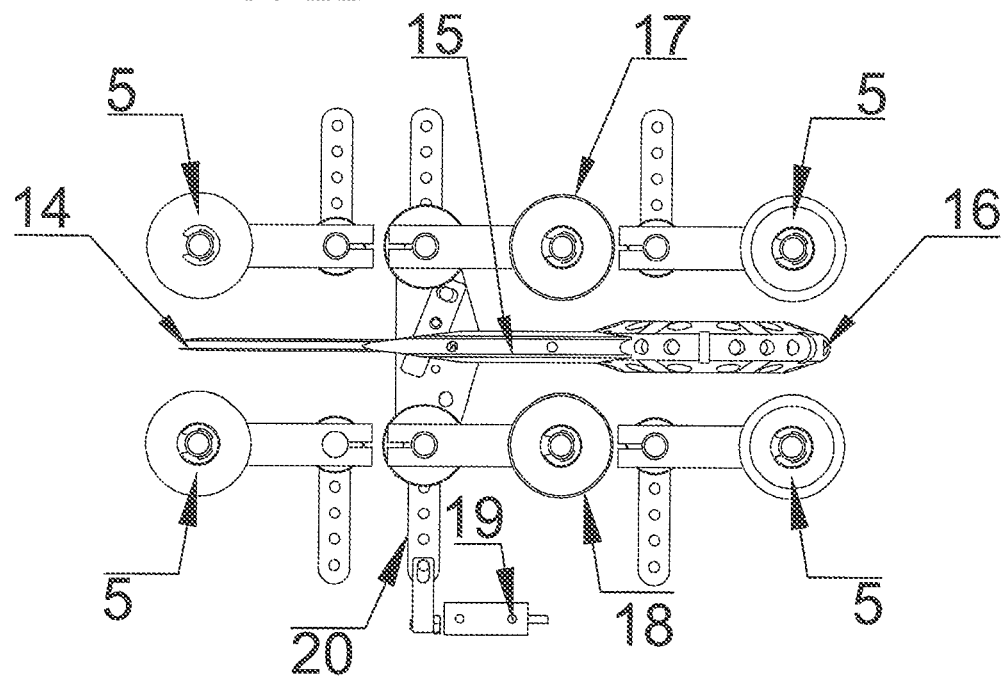
FIG. 2B is a top view of the belly opening blade, guide horse and cleaning wheel of the inlet section of the fish filleting machine of FIG. 1 illustrating a pair of idler rollers on opposite sides of the guide horse in their non-actuated positions.
Figures 1, 2B:
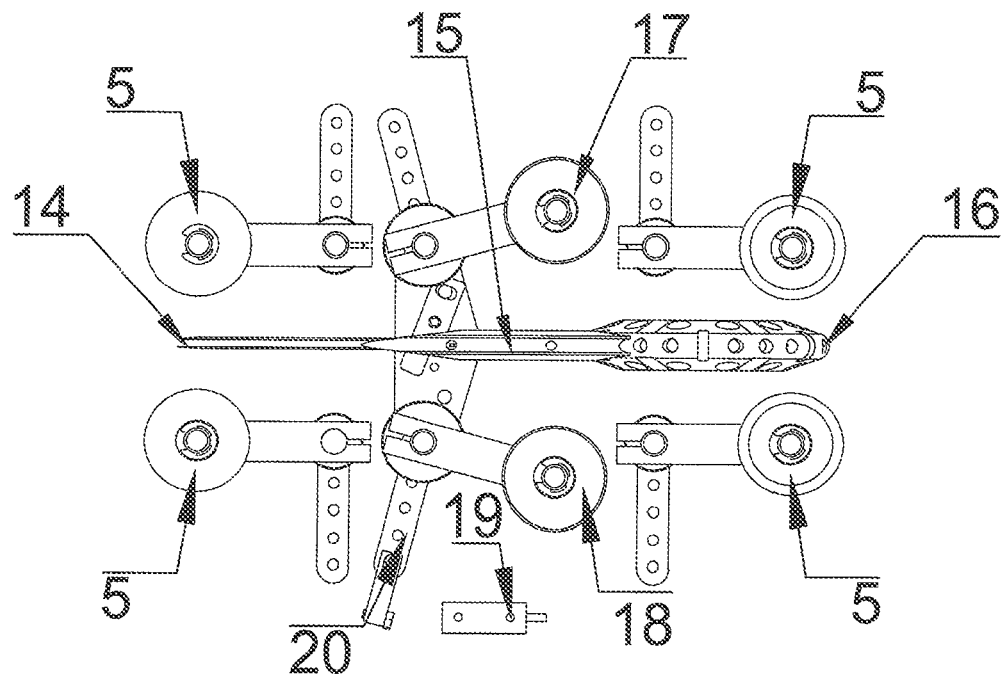
FIG. 1 is a side view in elevation of a fish filleting machine illustrating the preferred embodiment of the present invention.

Referring now to the drawings, FIG. 1 illustrates a fish filleting machine constituting a preferred embodiment of the present invention. The filleting machine includes a frame 1 supported by legs (not shown) having a plurality of work performing stations housed within an enclosure (not shown). The enclosure is generally defined by a rear wall (not shown), the frame 1 and a cover (not shown) which is pivotally mounted to the top of the rear wall. The filleting machine includes an inlet end 2 positioned at the left side as seen in FIG. 1 where headed fish are fed to the machine, and an outlet end 3 located at the right side as seen in FIG. 1 for collecting fish fillets produced by the machine for further processing. A pair of conventional spaced apart feed conveyor belts (not shown) extend along the length of the machine, and are used to transport the fish downstream from inlet end 2 to outlet end 3 along a conveying path to the various work stations of the machine. The conveying path is preferably parallel to the longitudinal centerline of the machine. The belts are driven in a conventional manner, as for example, by drive rollers 4, and are positioned and controlled by a plurality of conventional spring biased idler rollers 5. A programmable logic controller (PLC) is used to start and stop the machine as well as to set various operational parameters such as a "cut value" as will hereinafter be described.

The filleting machine illustrated in FIG. 1 provides an improved method and apparatus for filleting headed but belly intact fish to produce high yielding fillets from relatively short bodied fish in the size range of about 600 grams to about 3.5 kilograms dependent on species. The apparatus is designed to be capable of handling salmon, tilapia, trout, arctic char, barramundi, snappers, walleye pike, striped bass and similar species where the rib follows the contour of the belly cavity. Further, the apparatus incorporates belly opening and eviscerating components prior to subjecting the fish to the desired three blade backbone removal system so that the fish need only be headed, but not gutted, before introduction into the machine.

As shown in FIG. 2A and 2A-1, each fish has a leading end 6 and a trailing end 7. Each fish also includes a dorsal section 8 extending from leading end 6 to trailing end 7 above a backbone 9, and an anal section 10 extending from the rear of a belly cavity 11 from approximately the location of the anus of the fish to the trailing end 7 below the backbone 9. Each fish also has a set of ribs 12 extending from backbone 9 and enclosing belly cavity 11. It should be noted that each fish has an overall total longitudinal length of L which extends from the leading end 6 to trailing end 7, as well as a longitudinal length of ribs 12 which extend from leading end 6 to the trailing end of the major rib bones of the rib cage designated as R. It should be noted that the lengths L and R vary depending upon the species of fish being processed, and may be expressed as a "cut value" which is representative of the rib length as a percent of overall fish length. In other words, a 40% "cut value" indicates that the ribs 12 extend 40% along the total length of the fish from leading end 6 to trailing end 7. This "cut value" varies depending upon the species being processed, but does not vary within each species so that snappers will always have the same cut value no matter what size snapper is being processed. For example, snappers have a cut value of 28%. Each cut value would be entered into the PLC by an operator depending upon the species being processed prior to starting the fish filleting process in order to begin ending the rib cut at the trailing end of the major rib bones of the rib cage as will hereinafter be described.

Figure 2C:
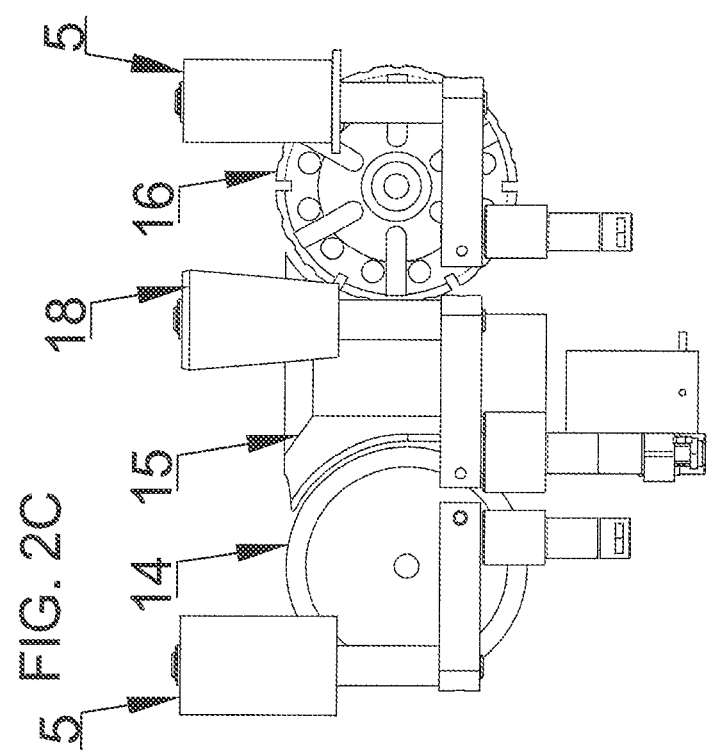
FIG. 2C is a side view in elevation illustrating the belly cutting blade, guide horse and cleaning wheel of the inlet section of the fish filleting machine with the idler rollers on opposite sides of the guide horse in their non-actuated positions.
Figures 1, 2C:
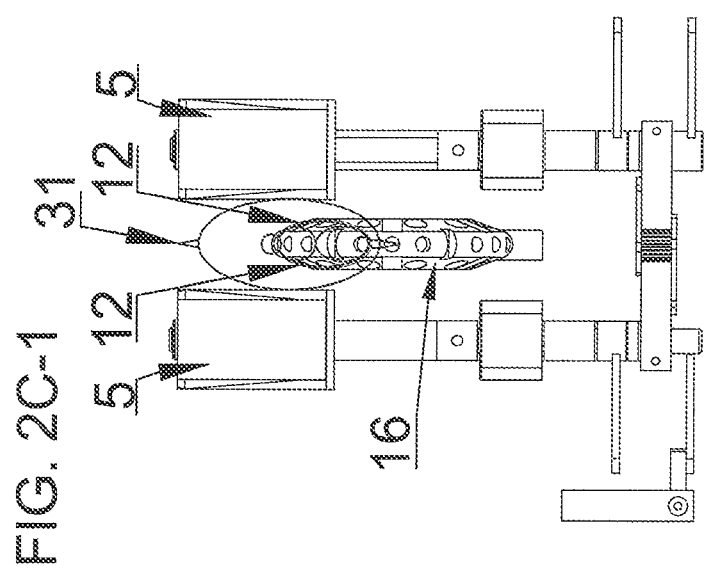
Figure 3A:
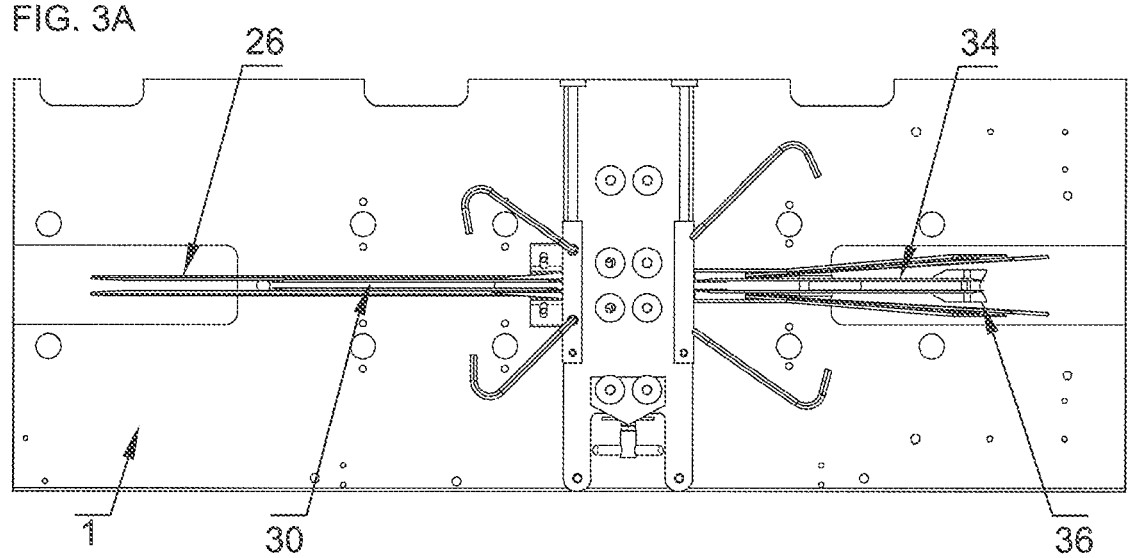
FIG. 3A is a top view of the offal section of the fish filleting machine.
Figures 1, 3A:
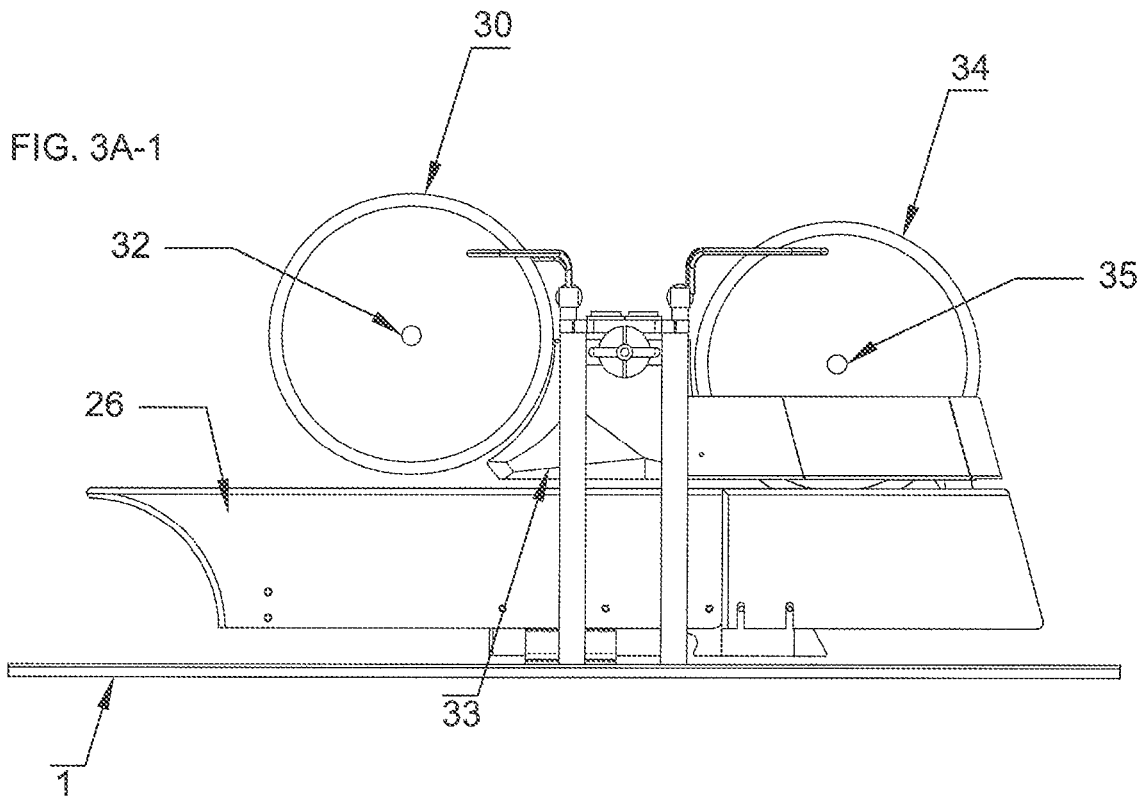

As shown in FIG. 1, the fish filleting machine of the present invention is composed of three sections. FIGS. 2, 2A, 2A-1, 2B, 2B-1, 2C, and 2C-1 illustrate the infeed section of the machine. FIGS. 3, 3A and 3A-1 illustrate the offal section of the machine, and FIGS. 4, 4A, 4A-1, 4B, 4B-1 and 4B-2 illustrate the outfeed section of the ,machine.

In order to locate the backbone 9 of the fish in the correct location for efficient high yield backbone removal, the fish is located with the front of the backbone 9 resting on a guide probe 13 that enters the belly of the fish just below the backbone 9 and exits the anus of the fish at the trailing end of belly cavity 11 as shown in FIGS. 2A and 2A-1. The backbone of the fish is thus positioned at an angle to the longitudinal direction of travel with its trailing end 7 above its leading end 6. The height of guide probe 13 is set at the exact location to transport the fish at the required position for subsequent operations in the machine to remove viscera, backbone and ribs.

The fish is then transported by means of drive belts, controlled by guide rollers 5, over a belly opening blade 14. Blade 14 is inset into the bottom of the guide probe 13 thereby ensuring that the belly opening cut made by blade 14 starts just below the backbone 9 and ends exactly at the anus without touching the backbone 9 or ribs 12 of the fish, as shown best in FIGS. 2A and 2A-1. The fish is then transported via the drive belts to a guide horse 15 and then over a rotating cleaning wheel 16 that is designed to remove the viscera without damage to the belly cavity, as shown in FIG. 2C-1.

As shown in FIGS. 2B and 2B-1, as the fish is transported on the guide horse 15 from the belly opening blade 14 to the cleaning wheel 16, it moves the rollers 17 and 18 that guide the belt outwardly due to its thickness, and in so doing actuates a sensor 19 that sends a signal to the PLC that is programmed to control the operation of the machine. This sensor 19 is preferably a proximity sensor linked to the pivotal movement of the roller control arm 20 as illustrated in FIGS. 2B and 2B-1. After receiving the signal from sensor 19, the control PLC counts encoder pulses from an encoder mounted on the gearbox that drives the machine's belts that carry the fish through the machine. Each encoder pulse thereby represents a known distance of belt movement and hence fish length as well as the position of the fish in the machine is known.

After removal of the viscera, the fish is transported over guide horse 24 to a pair of circular anal cut blades 21 that are set at a spacing corresponding to the required width of the anal fin cut for the fish species being processed in the machine. However, as shown in FIGS. 2A and 2A-1, as the fish approaches blades 21 on guide horse 24, it's backbone 9 is at an acute angle to the desired horizontal direction of travel that would have the fish passing over the blades 21 untouched and unsuitable for subsequent operations in the machine.

In order to position the backbone 9 of the fish in the required horizontal direction of travel for further operation, that is with the backbone 9 parallel to the direction of travel through the machine, and to facilitate the bottom anal fin cut by blades 21, the back of the fish is pushed down into the desired correct substantially horizontal orientation by a control arm 22 actuated by an air cylinder 23. Control arm 22 pivots on the lower end of a link 25 which in turn is pivotally mounted at its upper end to the outer end of air cylinder 23. It is essential that the front portion of the backbone 9 of the fish is located on guide horse 26, which is located after the anal cut blades 21, before the control arm 22 pushes down on the fish so that the front or leading end 6 of the fish cannot be pushed into the circular blades 21, but instead is held off the blades 21 and becomes the pivot point that the back or trailing end 7 of the fish rotates around. The bottom limit of travel of the push down control arm 22 is set by a mechanical screw stop 27 to ensure the fish is not over rotated but that the backbone 9 stays substantially parallel to the desired horizontal line of travel for the fish. FIG. 2 illustrates the control arm 22 at its bottom limit of travel where link 25 abuts against screw stop 27 while FIGS. 2A and 2A-1 illustrate the control arm 22 in an up position applying a downward force against the back or dorsal side of the fish where the link 25 is spaced from screw stop 27.

The timing of the actuation of control arm 22 is controlled by the PLC and is based on the number of encoder pulses representing the distance the fish has traveled. This push down signal is set to actuate when the front or leading end 6 of the backbone 9 of the fish is past top dead center of the circular blades 21, and is located on the guide horse 26 following the blades 21, and the fish has traveled a distance where the anal portion 10 of the fish to be cut by the blades 21, that is from the end of the belly cavity 11 to the tail or trailing end 7 of the fish, is in the required position. Therefore the actuation timing will vary according to the species being processed and in relation to the length of the belly cavity 11. The duration of the hold down pressure of control arm 22 is also set in the control PLC to correspond to the length of the fish and the distance or travel required in order to provide an anal cut from the end of the belly cavity 11 to the tail or trailing end 7 of the fish, as illustrated in FIGS. 2A and 2A-1.

After being repositioned by control arm 22, the backbone 9 of the fish is now in the correct substantially horizontal position to be further processed downstream by the anal cutting station, the dorsal cutting station, the backbone removal station, and the rib removal station of the machine. These operations are substantially the same, with some improvements hereinafter to be described, as those illustrated and described in U.S. Pat. No. 5,520,576, and therefore the disclosure provided by U.S. Pat. No. 5,520,576 is hereby specifically incorporated herein by reference.

As shown best in FIGS. 2, 2A and 2A-1, the anal cutting station includes a pair of spaced apart blades 21 for making a pair of longitudinal anal cuts in the fish on opposite sides of its anal spine and fin 28. As the fish approaches blades 21, its backbone 9 is located slightly above the tips of blades 21. The backbone 9 is untouched during the anal cut. This ensures an anal cut deep enough so that the entire anal spine and fin 28 may be removed at the backbone removal station, as will hereinafter be described. The blades 21 are thin disks affixed to shaft 29 which in turn is rotated by a motor (not shown) in any conventional manner. After passing over blades 21, the fish is driven downstream onto the anal guide horse 26. Anal guide horse 26 spreads the tail or trailing end 7 of the fish apart along the anal cut, and includes a central groove which receives the anal spine and fin 28 for guiding the fish downstream to a pair of dorsal cutting blades 30 at the next downstream station, which is the dorsal cutting station.

Referring now to FIGS. 3, 3A and 3A-1, the dorsal cutting station includes a pair of spaced apart dorsal cutting blades 30 for making a pair of longitudinal dorsal cuts in the fish on opposite sides of its dorsal spine and fin 31. The cutting blades 30 are in the form of thin disks mounted on shaft 32 which in turn is rotated by a motor (not shown) in any conventional manner. The tips of blades 30 are positioned slightly above the centerline of the machine so that the backbone 9 of the fish passes slightly beneath the tips of each blade 30. The tips of each blade 30 do not touch the backbone 9, but the depth of the dorsal cut ensures that the entire dorsal spine and fin 31 is slit from the fish. After being slit by the blades 30, the fish is transported downstream onto a dorsal guide horse 33. Dorsal guide horse 33 spreads the dorsal section 8 of the fish apart along the dorsal cut to provide adequate room for entry of a pair of backbone removal blades 34 at the next downstream station, which is the backbone removal station. Dorsal guide horse 33 also includes a central groove which receives the dorsal spine and fin 31 after being cut away by the blades 30 to aid in guiding the fish downstream to the backbone removal station.

The backbone removal station includes a pair of spaced apart backbone removal blades 34 which are positioned to cut through the ribs 12 of the fish on both sides of the backbone 9. The blades 34 enter from the dorsal side of the ribs 12 of the fish, and thereby split the fish into two individual rib-in portions. Each rib-in portion is separate from the backbone 9, dorsal spine and fin 31, anal spine and fin 28, and tail 7, but not the ribs 12. The backbone removal blades 34 comprise a pair of thin disks mounted on a shaft 35 which in turn is rotated by a motor (not shown) in any conventional manner. In order to make the desired backbone removal cut, FIGS. 3 and 3A-1 illustrate that the tips of blades 34 extend below the centerline of the machine. Thus, as the fish passes through the backbone removal station, blades 34 cut through the dorsal ends of the ribs 12, and as the fish is driven downstream, a downwardly angled ejector plate 36 forces the backbone 9, dorsal spine and fin 31, anal spine and fin 28, and tail 7 to be ejected in one piece downwardly from the machine. At this stage, two individual rib-in portions exit the backbone removal station with each rib-in portion containing meat still attached to the ribs 12 of the fish.

The two individual rib-in portions are next transported downstream to the rib removal station of the machine. At the rib removal station, which is illustrated in FIGS. 3B, 4, 4A, 4A-1, 4B, 4B-1 and 4B-2, a pair of spaced apart rib removal blades 37 are positioned to make a rib cut along the interface formed between the ribs 12 and the flesh of each individual rib-in portion to result in a pair of fillets free of the ribs 12. These fillets are then ejected from the outlet end 3 of the machine for further processing. Each rib removal blade 37 comprises an elongated knife orientated in a vertical plane slightly spaced on either side of the centerline of the machine with its cutting edge in an upstream direction. Each blade 37 has an upper end and a lower end and are orientated at an acute angle with respect to the centerline of the machine such that the upper end of each blade 37 is located upstream from the lower end of each blade 37. Blades 37 are mounted for reciprocal movement by means of a motor driving a shaft 38 located beneath frame 1. Shaft 38 is connected to an eccentric 39 which is connected to a crank arm 40 which in turn is connected to blades 37. Thus, rotation of shaft 38 results in the reciprocation of blades 37.

Since rib removal blades 37 are orientated in a vertical plane and have straight cutting edges, each rib-in portion being transported downstream from the backbone removal station must be properly presented to the blades 37 in order to minimize meat loss when making a rib cut along the interface formed between the ribs 12 and the flesh attached to ribs 12. In order to accomplish this, each individual rib-in portion is squeezed against the sides of a rib guide 41 prior to engaging the rib removal blades 37 so that the ribs 12, which are normally arcuate-shaped, become positioned in a substantially upright planar orientation, as shown in FIG. 4A-1. In order to squeeze the individual rib-in portions, there are four individually and independently operated rib fingers 42a-42d on one side of the rib guide 41, and four individually and independently operated rib fingers 42e-42h on the other side of rib guide 41. The fingers 42a-42d and 42e-42h have corresponding pneumatic cylinders 43a-43d and 43e-43h, respectively, that control their positions so as to push on the outer ends of rib fingers 42a-42h and exert a desired degree of pressure at different locations on the outside of the rib-in portion in order to push the ribs 12 under the rib removal blades 37, as shown best in FIG. 4A-1. The pressure on each finger 42a-42h is individually controlled from the PLC via electro solenoid control valves which allows the degree of pressure and the duration of application of pressure to be controlled to each individual finger 42a-42h. Above the upper rib finger 42a there is an additional trip finger 44 pivotally mounted to a trigger arm 45 which in turn is linked to a proximity sensor 46. When the leading edge 6 of the individual rib-in portions displaces the belt as it enters the rib removal station, the trip finger 44 is moved outwardly so that the proximity sensor 46 sends a signal to the PLC. Pressure is then applied to the individual rib fingers 42a-42h at varying desired pressures, as set in the PLC, depending on the species of fish and thickness of the ribs to be removed. Applying variable degrees of pressure against the rib-in portions typically involves applying a greater degree of pressure at the top of each rib-in portion where the ribs are thicker than at the bottom of each rib-in portion where the ribs are thinner. Pressure can then be gradually eased as the rib-in portions pass through the rib removal blades 37 in accordance with the reduction in the thickness of the ribs, which may get thinner towards end of the rib cage, thereby reducing the removal of excess flesh with the ribs. The pressure on the fingers then drops to zero at the end of the rib cut.

The length of the rib cage and hence the timing of the rate of release of pressure on the rib fingers 42a-42h down to zero, is determined by the measurement of the number of encoder pulses from sensor 19 at the infeed section of the machine, which provides the total length of the fish. This figure is divided by a "cut factor" which is entered into the PLC by an operator. This cut factor is the percentage of the length of the fish that the rib cage covers. Once the measurement signal generated as a result of activation of sensor 19 matches the cut value entered into the PLC, the PLC generates an actuation signal to lower a rib shroud 47 to ensure no flesh beyond the end of the rib cage is cut from the individual fish portions so as to produce high yielding rib free fillets.

The cut factor data is also used to close the distance between the rib guide 41 and the rib removal blades 37, which is referred to as the "rib gap," as the individual rib-in portions pass the rib removal blades 37. The rib gap, which is controlled by an eclectic linear motor that positions the rib guide 41 in relation to the rib removal blades 37 is set initially according to the size of the fish, but is then reduced as the rib-in portions pass the blades 37 in order to minimize the flesh removed with the ribs and enhance fillet yield.

Shroud 47 moves downwardly to cover the cutting edges of rib removal blades 37 and thereby end the rib cut. As shroud 47 moves downwardly, it progressively covers more of the cutting edges of blades 37 so that as the rib-in portions are driven downstream past the blades 37, not only are the ribs 12 removed, but an angled cut results in maximizing the amount of desirable meat along each tail section 7. The angle of the cut may be controlled by controlling the speed at which shroud 47 is lowered to cover blades 37. Thus, by increasing the speed of shroud 47 a sharper cut angle will result, and by slowing the speed of shroud 47 a less inclined cut will result. In any event, shroud 47 is actuated only after the trailing end of the rib bones of the rib cage passes blades 37 as determined by the previously entered "cut value" for the particular species of fish being processed and the position of the fish at the rib removal station. The angle of the final cut is also determined by the species of the fish being processed since for some fish the ribs gradually become smaller so that a less inclined cut is desirable, whereas in other species the ribs end abruptly so a sharper angle cut is desirable. The sequential covering of rib removal blades 37 is illustrated in FIGS. 4B-1 and 4B-2 with FIG. 4B-1 showing the blades 37 uncovered and shroud 47 up, and FIG. 4B-2 showing the blades 37 covered and shroud 47 down. After the individual rib-in portions pass rib guide 41, the shroud 47 is reset and moved back to its upper position to await the individual rib-in portions of the next following fish passing through the machine.

Method of Operation

Feeding:

The head off fish is fed into the machine with the backbone located onto a locating "spear" or guide probe 13 which is fed into the belly cavity, the feed tray of the machine being adjusted to a height location to accommodate this action.

The end of the spear or probe 13 is shaped such as to easily locate and exit the anus of the fish at the end of the belly cavity, allowing the fish drive belts to carry the fish into and through the machine.

This backbone location method means the fish is transported into the machine with the backbone at an acute angle relative to a horizontal line of travel for the fish so that the fish is correctly orientated to be properly eviscerated by the belly opening blade 14 and cleaning wheel 16. This acute angle is determined by the relationship between the backbone and the anus of the fish. However, in order for the fish to be correctly orientated for transportation through the yield enhancing three blade set backbone removal system, the backbone needs to be parallel to the horizontal line of travel through the machine. The realignment of the fish position is achieved by the "hold down" arm 22, and the actuation of arm 22 is in turn controlled by the PLC.

Figure 4:
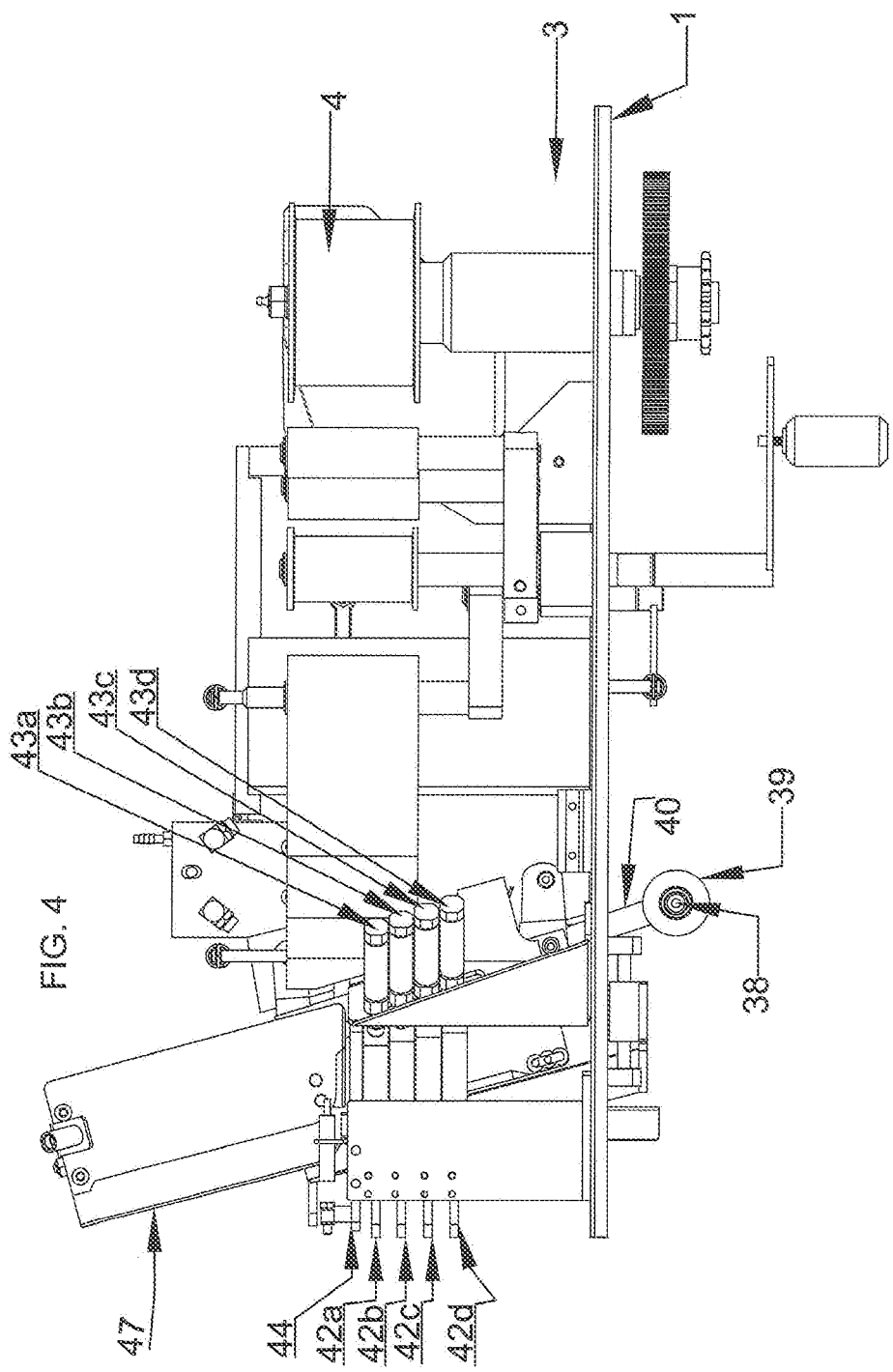
FIG. 4 is a side view in elevation of the outfeed section of the fish filleting machine illustrating the rib removal station and belt drive rollers for the machine.
Figure 4A:
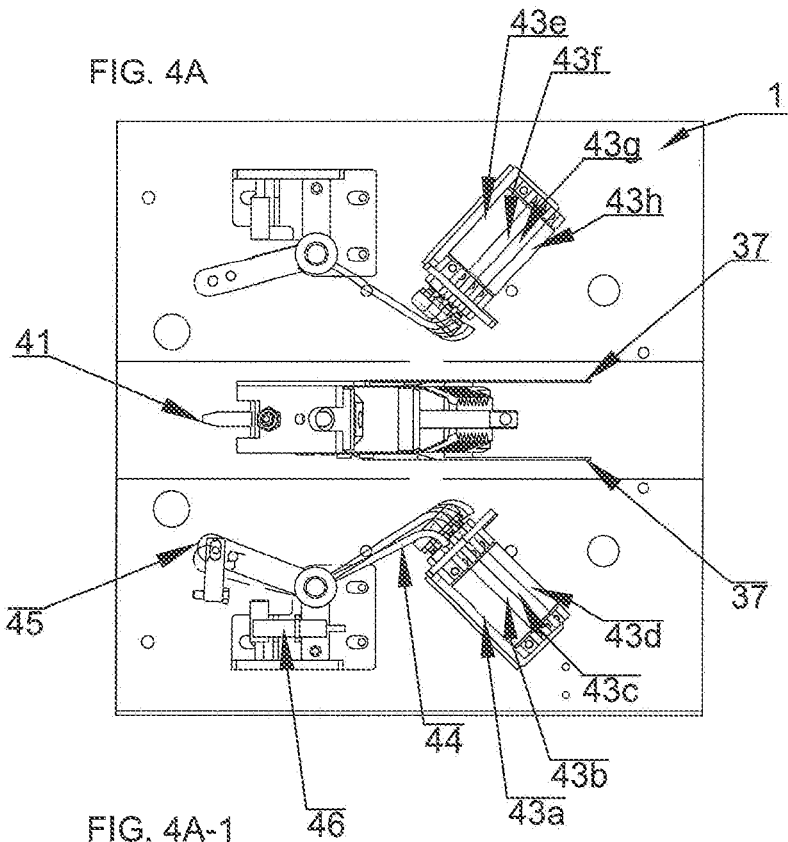
FIG. 4A is a top plan view of the rib removal station.
Figures 1, 4A:
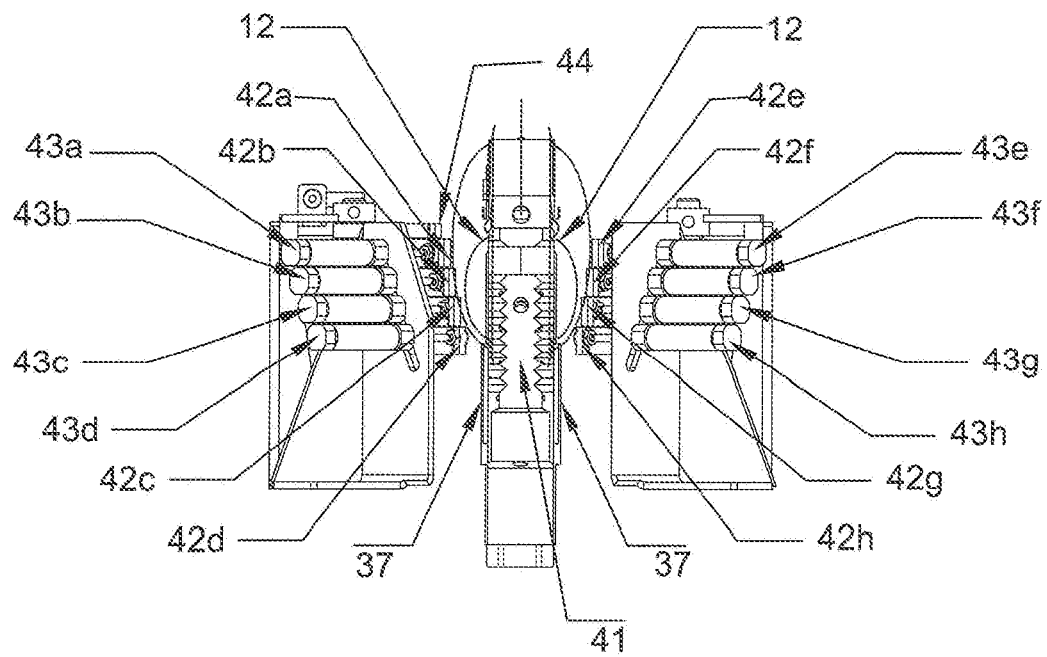
Figure 4B:
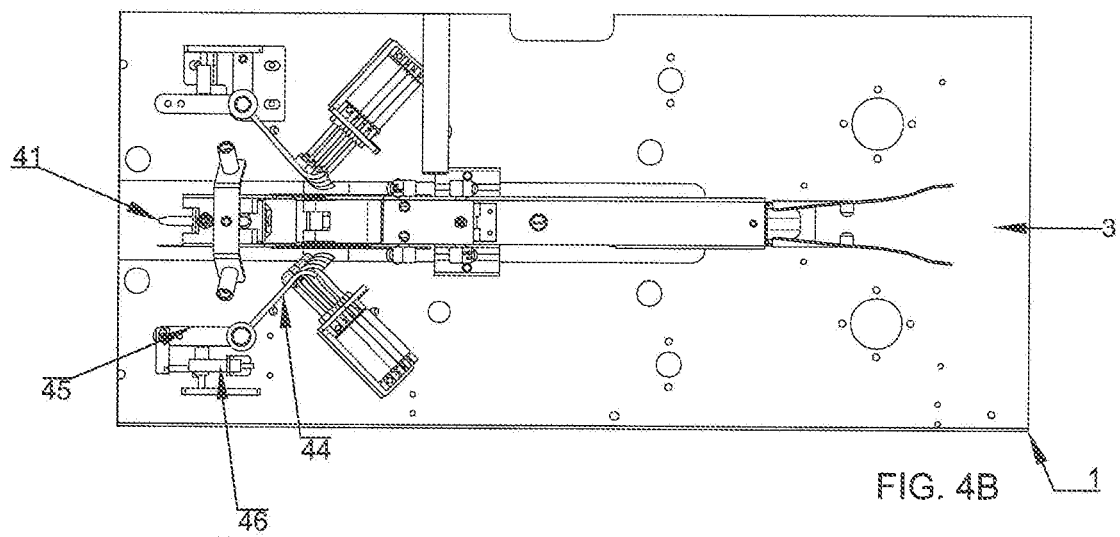
FIG. 4B is a top view of the outfeed section of the fish filleting machine.
Figures 1, 4B:
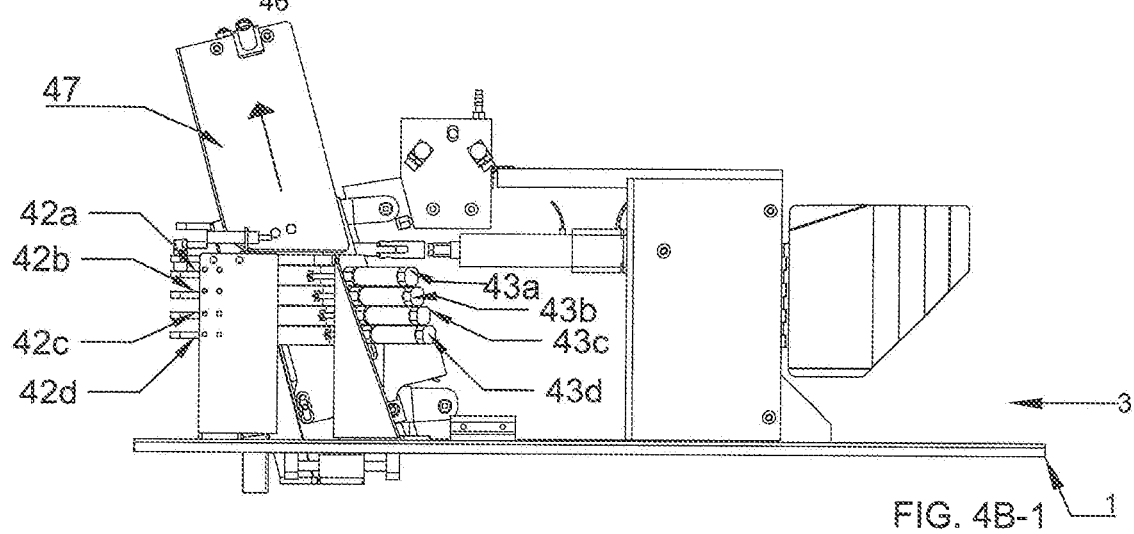
Figures 2, 4B:
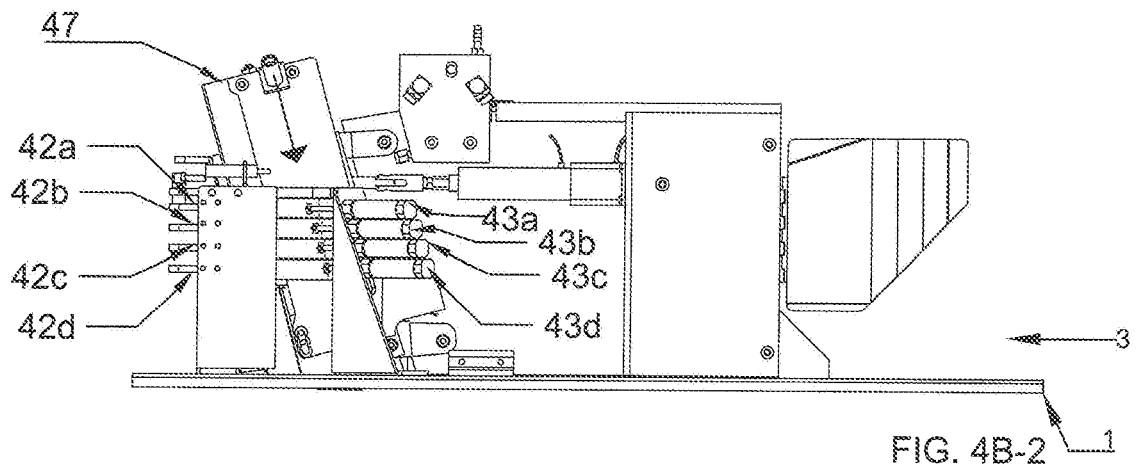

Hold down arm operation:

The timing of the hold down action is as follows:

Infeed sensor 19 is a proximity sensor, and when the front of a fish actuates an arm 49 linked to a metal plate 50 that is in contact with the proximity sensor, the plate 50 is moved away from the sensor 19 which now becomes "open" and begins recording encoder pulses from sensor 51, located on the fish drive system shown in FIG. 4. When the length of the fish has passed under the link arm 49 the metal plate 50 attached to the link arm 49 comes back into contact with proximity sensor 19 and the sensor 19 is "closed" and stops counting pulses.

The number of pulses is then converted to mm to represent the length of the fish.

The link arm 49 may not traverse the entire length of the fish due to the body shape and tail structure of various fish species, therefore a "tail offset" value, in encoder counts (mm), is added to the measurement reading from sensor 19 to arrive at the "true fish length."

The actuation of the "hold down" arm 22 needs to occur when the front of the fish is past top dead center (TDC) of the anal cut blades 21 and must push the back end of the fish onto, and the anal fin of the fish between, the anal cut blades 21, and thereby producing the cut below the back bone from the end of the belly cavity past the tail.

The distance from infeed sensor 19 to TDC is a fixed distance of 575 mm.

Therefore in order for the actuation of the hold down arm air cylinder 23 to occur when the back of the fish at the end of the belly cavity is on TDC, the actuation setting, termed "hold down delay" is determined to be 575 mm+CV (cut value) of the "true length of fish."

The output to actuate the return of the air cylinder 23 and hence the hold down arm 22 to the starting position to await the next fish, should occur after a programmable variable, termed the "hold down dwell" has been added to "hold down delay." The "hold down dwell" is determined by the length of the fish being processed and hence the length of time the hold down arm 22 needs to be in contact with the fish.

The output for return of the hold down arm 22 to the up position is therefore equal to 575 mm+CV+hold down delay+hold down dwell.

The length of travel of the hold down arm 22 is adjustable according to the size and species of the fish and should be set so as that the backbone of the fish is pushed exactly parallel to the line of travel through the machine.

Blade Spacing:

The fish is then transported through the dorsal cut blades 30, which cut down to the backbone, and then to the backbone blades 34 which remove the backbone.

Both of these sets of blades are set by means of spacers according to the size and species of fish. The dorsal cut blades 30 are set according to the width of the dorsal spine, and the backbone removal blades 34 according to the width of the backbone.

After removal, the backbone is ejected under the machine.

The ribs-in fillets are then transported past the reciprocating rib removal blades 37 for the rib removal operation. The rib removal is a controlled operation involving (1) a rib guide 41 positioned in relationship to the rib blades 37 by a linear actuator in order to set the appropriate rib gap for the size of fish; (2) a set of eight rib fingers 42*a*-42*d* to apply pressure to the outside of the fish drive belts and push the ribs under the rib removal blades 37; and (3) a "rib shroud" 47 to cover the blades 37 and ensure the rib cutting operation stops at the end of the ribs and does not remove flesh from the fillet after the ribs have been removed.

Rib cut linear actuator:

A linear actuator 52 controls the position of the rib guide 41 in relation to the reciprocating rib removal blades 37, thereby setting the dimension of the "rib gap" which is determined by the thickness of the ribs of the fish being processed.

When the machine is switched on, the linear actuator 52 moves to the maximum open position and into contact with proximity sensor 46, this is the "home position."

There is another proximity sensor 53 located on a sensor roller 54 about 400 mm in advance of the rib removal blades 37. The spring arm that rotates with the movement of this sensor roller 54 has an assembly attached which has an adjustable bolt head that is in contact with proximity sensor 53 when the arm is at rest on the fish drive belt. When the front of the fish fillet reaches the roller 54 and moves it away from the belt, thereby rotating the spring arm, this rotation moves the nut away from the sensor 53 which now becomes open and begins recording pulses from sensor 51.

Also when sensor 53 is triggered the linear actuator 52 moves the rib guide 41 forward to the programmed "rib gap" position.

Triggering of the movement from the "rib gap" position to the "rib closed" position, and thus closing the gap between the rib guide 41 and the rib removal blades 37, takes place after the fillet has traveled the 400 mm distance between sensor 53 and the rib removal blades 37, plus the calculated, programmable CV value, plus a value termed "roller offset" which is necessary to compensate for fillets of differing thicknesses causing the roller 54 to move before the front of the fillet is actually level with the roller centerline and therefore not at the 400 mm distance from the rib removal blades 37.

So movement of the rib guide 41 from rib gap to rib closed actuation is: 400 mm+CV+roller offset.

The rib guide 41 stays in the rib closed position until the true length of the fish fillet has passed the rib removal blades 37 at which point the linear actuator 52 receives a signal to return to the "home" position.

The calculation for activation of the return signal is therefore: 400 mm+roller offset+true fish length.

There is a queuing protocol for 5 true fish length values captured at infeed sensor 19 so they can be called for at sensor 53 as required for the relevant fish.

The queue is cleared when the machine in turned off for any reason.

A linear actuator 52 controls the position of the rib guide 41 in relation to the reciprocating rib removal blades 37 to thereby set the dimension of the "rib gap" which is determined by the thickness of the ribs of the fish being processed.

Rib Finger Operation:

The rib bones are pushed into the "rib gap" to be removed by the rib removal blades 37 by rib fingers 42a-42h positioned on the outside of the fish drive belts, directly in line with the cutting edge of the rib removal blades 37.

There are eight rib fingers 42a-42h, as shown best in FIGS. 4A-1 and 4B, with four on each side of the machine to act on the ribs in the fillets on either side of the machine.

The pressure to each rib finger 42a-42h is applied by individual air cylinders 43a-43h, respectively, acting on each individual rib finger 42a-42h to provide variable and precise control of pressure to each individual rib finger 42a-42h so they may be set as required. This allows for more pressure to be applied on the top of the ribs, where the ribs are thickest and less pressure on bottom of the ribs where they are thinner. The ability to provide variable pressure to individual fingers 42a-42h also provides the option of removal of the white membrane below the ribs for D style trim fillets, or no pressure for production of C style trim fillets.

The ability to provide varying amounts of pressure on each individual rib finger 42a-42h is programmed through ITV electronic solenoids and is set as a percentage of the air pressure supplied which is normally 80 PSI (5.5 BAR).

When sensor 53 is triggered open, the pressure as programmed for each individual finger 42a-42h is applied to the appropriate air cylinder 43a-43h, and is designated the "start pressure." After the 400 mm+CV+roller offset value has passed the rib removal blades 37, the rib finger pressure is reduced to the "stop pressure" programmed for each individual rib finger 42a-42h. This stop pressure is applied until the entire "true fish length" has passed the rib removal blades 37 after which all pressure is then released. The signal for the pressure to be released is programmed as: 400 mm+roller offset+true fish length, after the triggering of sensor 53.

There is a queuing protocol for 5 true fish lengths as captured at infeed sensor 19 so that they can be called for at sensor 53 as required for the relevant fish.

The queue is cleared when the machine in turned off for any reason.

Rib shroud operation:

The rib shroud 47 is a cover that is pneumatically operated to come down to cover the cutting's edge of the rib removal blades 37 to ensure no flesh is removed after the ribs have been removed.

The cylinder 48 for moving shroud 47 in this operation is in the center of the rib guide 41, and the shroud 47 is attached to the piston that travels in this internal cylinder.

The starting position of the rib shroud 47 is in the up position as shown in FIG. 3B as well as in FIG. 4B-1 with the rib removal blades 37 exposed.

The output for actuation of the down motion of the rib shroud 47 is triggered by sensor 53 to occur after the ribs have passed the rib removal blades 37, and so is calculated and programmed at a value of: 400 mm+roller offset+CV.

The output for the actuation for the return of the rib shroud 47 to the up starting position to again expose the rib removal blades 37 for rib removal form the next fillet is after the true fish length has passed the rib removal blades 37, and so is calculated and programmed as: 400 mm+roller offset+true fish length.

There is a queuing protocol for 5 true fish lengths as captured at infeed sensor 19 so that they can be called for at sensor 53 as required for the relevant fish.

The queue is cleared when the machine in turned off for any reason.

I claim:

1. A method of filleting fish for producing fish fillets free of bones, comprising:
    feeding a headed, belly intact fish along a substantially horizontal conveying path in a belly-side-down, tail end up, and head end leading position with its backbone at an acute angle to the substantially horizontal conveying path;
    slitting the fish longitudinally to open its belly cavity from the head end of the fish to its anus;
    cleaning viscera from the belly cavity;
    repositioning the fish so that its backbone is substantially parallel to the substantially horizontal conveying path;
    slitting the fish longitudinally to make an anal cut on opposite sides of its anal spine;
    slitting the fish longitudinally to make a dorsal cut on opposite sides of its dorsal spine to produce a pair of integral portions each connected to its backbone by ribs;
    cutting through the ribs on either side of the backbone of the fish to split the fish into two individual rib-in portions each separate from the backbone, dorsal spine, anal spine and tail, but not ribs; and
    cutting the ribs away from the individual rib-in portions to provide a pair of fish fillets free of ribs.

2. The method of claim 1 wherein the step of repositioning the fish comprises the step of moving the tail end of the fish down.

3. The method of claim 2 wherein the step of moving the tail end of the fish down comprises the step of pushing downwardly on the tail end of the fish as it moves downstream along said conveying path.

4. The method of claim 1 wherein the step of cutting the ribs away further includes the step of controlling the rib cut of each individual rib-in portion to begin at the head end of the ribs and end at the trailing end of the ribs without changing the orientation of each individual rib-in portion as it moves downstream along said conveying path.

5. The method of claim 4 wherein the step of controlling the rib cut further includes the steps of:
    (a) measuring the longitudinal length of the fish;
    (b) measuring the longitudinal length of the ribs of the fish;
    (c) determining a cut value which is representative of rib length to fish length; and
    (d) actuating a shroud to cover said rib cutting blades to end the rib cut at the trailing end of the ribs based on said cut value.

6. The method of claim 5 wherein the step of controlling the rib cut further includes the step of applying variable degrees of pressure against each individual rib-in portion so that the ribs are positioned in a substantially planar orientation whereby the rib cut can be made along the interface formed between the substantially planar orientated ribs and flesh of each individual portion.

7. The method of claim 6 wherein the step of applying variable degrees of pressure against said rib-in portions comprises applying a greater degree of pressure at the top of each rib-in portion where the ribs are thicker than at the bottom of each rib-in portion where the ribs are thinner.

8. A fish filleting machine for producing fish fillets from a headed, belly intact fish being transported belly-side-down, tail end up, and head end leading along a substantially horizontal conveying path, said machine comprising:
   a guide probe on which a fish to be filleted is located with its backbone at an acute angle to the substantially horizontal conveying path;
   a belly opening blade downstream of said guide probe for slitting the fish longitudinally to open its belly cavity from its head end to its anus;
   a cleaning wheel downstream from said belly opening blade for removing viscera from the belly cavity of the fish;
   a control arm engageable with the fish to reposition the fish after passing over the cleaning wheel so that its backbone is substantially parallel to the substantially horizontal conveying path;
   a pair of spaced apart anal cutting blades for making a pair of longitudinal anal cuts in said fish on opposite sides of its anal spine;
   a pair of spaced apart dorsal cutting blades for making a pair of longitudinal dorsal cuts in said fish on opposite sides of its dorsal spine to produce a pair of integral portions each connected to its backbone by ribs;
   a pair of spaced apart backbone removal blades located downstream of said dorsal cutting blades and positioned to cut through the ribs on either side of the fish backbone to split the fish into two individual rib-in portions each separate from the backbone, dorsal spine, anal spine and tail, but not ribs; and
   a pair of spaced apart rib removal blades located downstream of said backbone removal blades and positioned to make a rib cut along the interface formed between the ribs and flesh of each individual rib-in portion to provide a pair of fish fillets free of ribs.

9. The fish filleting machine of claim 8 further including an actuator connected to said control arm that sequentially moves said control arm between a fish-engaging position when a fish reaches said anal cutting blades and a non-fish-engaging position after said fish passes over said anal cutting blades.

10. The fish filleting machine of claim 8 further comprising a pressure assembly located upstream of said rib cutting blades that applies varying degrees of pressure against each individual rib-in portion so that the ribs are positioned in a substantially planar orientation.

11. The fish filleting machine of claim 10 wherein said pressure assembly applies a greater degree of pressure at the top of each rib-in portion where the ribs are thicker than at the bottom of each rib-in portion where the ribs are thinner.

12. The fish filleting machine of claim 11 wherein said pressure assembly comprises a plurality of pivoting fingers each individually and independently movable between a position engaging a rib-in portion and a position non-engaging a rib-in portion, and a plurality of corresponding cylinders connected to each of said individual fingers, said cylinders being individually and independently actuatable to move said fingers against a rib-in portion and apply a desired degree of pressure thereto.

13. The fish filleting machine of claim 12 wherein said cylinders are pneumatic actuated cylinders.

* * * * *